United States Patent
Sawamoto

(10) Patent No.: US 7,400,455 B2
(45) Date of Patent: Jul. 15, 2008

(54) ZOOM LENS SYSTEM AND DISPLAY APPARATUS

(75) Inventor: Akira Sawamoto, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 0 days.

(21) Appl. No.: 11/692,289

(22) Filed: Mar. 28, 2007

(65) Prior Publication Data

US 2007/0229977 A1  Oct. 4, 2007

(30) Foreign Application Priority Data

Apr. 3, 2006  (JP) .............................. 2006-101793

(51) Int. Cl.
*G02B 15/14* (2006.01)

(52) U.S. Cl. ...................... 359/691; 359/676

(58) Field of Classification Search ................. 359/691, 359/676

See application file for complete search history.

(56) References Cited

U.S. PATENT DOCUMENTS 7,253,966 B2 *  8/2007  Saori ........................... 359/691

2007/0070518 A1 *  3/2007  Muratani et al. ............ 359/680

FOREIGN PATENT DOCUMENTS

| JP | 2002-148515 | 5/2002 |
|---|---|---|
| JP | 2004-240309 | 8/2004 |

* cited by examiner

*Primary Examiner*—Ricky L Mack
*Assistant Examiner*—James R Greece
(74) *Attorney, Agent, or Firm*—Thompson Hine LLP

(57) ABSTRACT

A zoom lens system that has two lens groups with respectively negative and positive refractive powers in that order from a display medium, such as a screen, side is provided. The first lens group and the second lens group respectively include at least one aspherical surface. An air distance dw between the first lens group and the second lens group at the wide angle end, an air distance dt between the first lens group and the second lens group at the telephoto end, a combined focal length f1 of the first lens group, a combined focal length f2 of the second lens group, and the combined focal length fw of the zoom lens system at the wide angle end satisfy the following conditions: $0.05 < dt/dw < 0.1$; $dt < 2.5$ mm; $1.3 < |f1/fw| < 1.6$; $1.1 < |f2/f1| < 1.4$.

6 Claims, 4 Drawing Sheets

Fig. 1
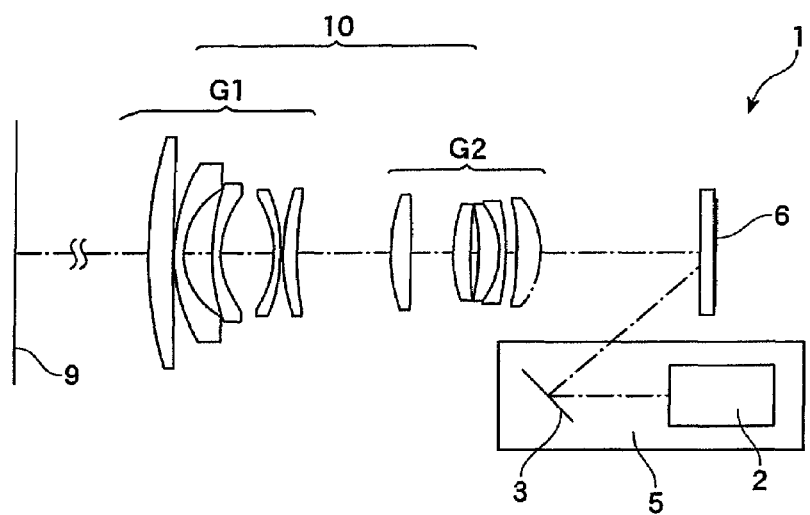
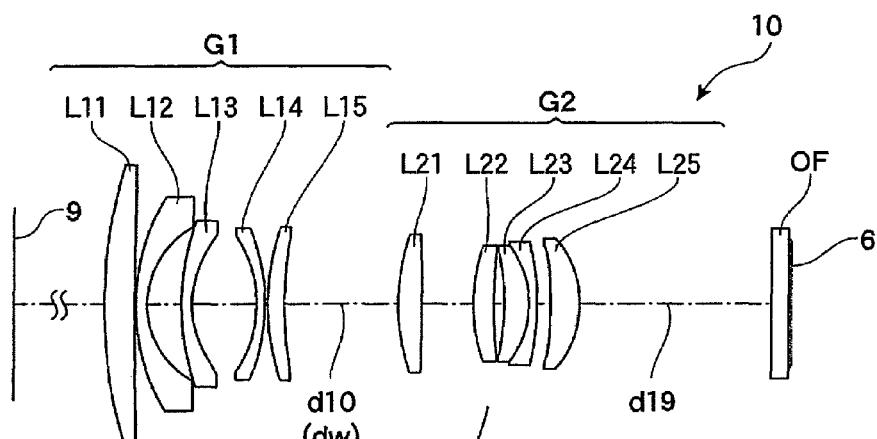
Fig. 2A
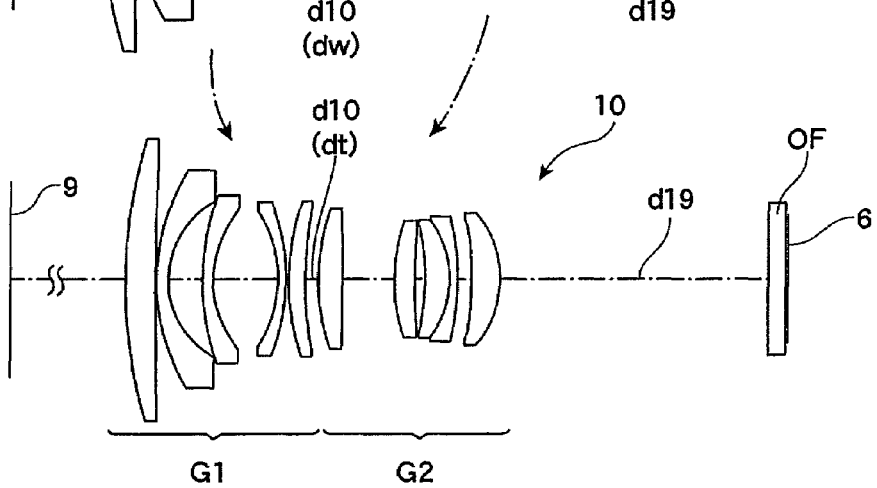
Fig. 2B

ZOOM LENS SYSTEM AND DISPLAY APPARATUS

CROSS-REFERENCE TO RELATED APPLICATIONS

This application is based upon and claims the benefit of priority from the prior Japanese Patent Application No. 2006-101793, filed Apr. 3, 2006, the entire contents of which are incorporated herein by reference.

BACKGROUND

The present invention relates to a zoom lens system for a projector.

As one example of zoom lens systems for projecting an image onto a screen from a light modulating device, such as a DMD ("digital mirror device" or "digital micro device"), equipped with a plurality of elements that form an image by changing the direction of reflection of light, a zoom lens system that includes a first lens system with negative refractive power and a second lens system with positive refractive power in that order from the screen side is known.

The zoom lens disclosed by Japanese Laid-Open Patent Publication No. 2002-148515 consists of a total of ten lenses with four lenses in the first lens group and six lenses in the second lens group, and has a zoom ratio of 1.2.

The zoom lens disclosed by Japanese Laid-Open Patent Publication No. 2004-240309 consists of a total of twelve lenses with five lenses in the first lens group and seven lenses in the second lens group, and also has a zoom ratio of 1.2.

A zoom lens system composed of two lens groups with respectively negative and positive refractive powers has a simple construction and is compact, thereby making it suited to a low-cost projector. Accordingly, the use of this type of zoom lens system in a portable projector, a consumer projector, or the like is being investigated. To project enlarged images that are bright and sharp, a zoom lens system for a projector needs to be bright, i.e., to have an F number of around 2.4 to 3, and to favorably correct aberration. In addition, a zoom lens system of a reflection-type projector that uses a DMD needs to have a sufficiently long back focus to provide sufficient space for light to be irradiated onto the DMD to illuminate the DMD.

Although there are also demands for higher zoom ratios, it is not easy to increase the zoom ratio in addition to satisfying the demands described above for a zoom lens system used in a projector. For example, for the zoom lens systems disclosed in Patent Documents 1 and 2, sufficient aberration correcting performance is achieved by setting the refractive powers of the first lens group and the second lens group substantially equal. Since it is difficult to obtain sufficient peripheral light when the length of the lens is increased relative to the back focal length at the wide angle end, the zoom ratio is suppressed to around 1.2.

SUMMARY

One aspect of the present invention is a zoom lens system consisting, in order from a display medium side, of a first lens group that has negative refractive power and a second lens group that has positive refractive power, the first lens group and the second lens group respectively including at least one aspherical surface, wherein an air distance dw between the first lens group and the second lens group at the wide angle end, an air distance dt between the first lens group and the second lens group at the telephoto end, a combined focal length f1 of the first lens group, a combined focal length f2 of the second lens group, and the combined focal length fw of the zoom lens system at the wide angle end satisfy the following conditions.

| | |
|---|---|
| $0.05 < dt/dw < 0.17$ | (1) |
| $dt < 2.5$ mm | (2) |
| $1.3 < |f1/fw| < 1.6$ | (3) |
| $1.1 < |f2/f1| < 1.4$ | (4) |

The ratio (dt/dw) of the air distance dt at the telephoto end to the air distance dw at the wide angle end should preferably be low to achieve a high zoom ratio. However, to reduce the ratio (dt/dw), it is necessary to increase the air distance dw at the wide angle end, which makes the lens longer and also reduces the amount of peripheral light. This makes reducing of the ratio (dt/dw) in a zoom lens system difficult.

In the present zoom lens system, by reducing the air distance dt at the telephoto end to below 2.5 mm, it is possible to prevent the lens from becoming excessively long at the wide angle end even if the ratio (dt/dw) is reduced, and therefore it is possible to provide a zoom lens system that is compact and can display bright images with sufficient peripheral light. That is, in this zoom lens system, if the range of Condition (1) is exceeded, it will be difficult to increase the zoom ratio, while below the range of Condition (1), the length of the lens is increased and it becomes difficult to provide a compact lens system at low cost.

In addition, by reducing the ratio (dt/dw), it is possible to raise the power distributed to the first lens group within the ranges of Conditions (3) and (4) and thereby achieve both sufficient aberration correcting performance and a sufficiently long back focal length.

That is, if the range of Condition (3) is exceeded, the negative power of the first lens group will fall, which results in the lens system becoming longer. Conversely, below the range of Condition (3), the power of the first lens group will be too strong, which makes it difficult to sufficiently correct spherical aberration and coma aberration.

If the range of Condition (4) is exceeded, the negative power of the first lens group will be too strong, which makes it difficult to sufficiently correct spherical aberration and coma aberration. Conversely, below the range of Condition (4), the negative power of the first lens group will be too weak, which makes it difficult to correct coma aberration and also results in the lens system becoming longer and it becoming necessary to increase the lens diameter, thereby making it difficult to provide a compact lens system.

In addition, it is preferable for the total length Lw of the zoom lens system at the wide angle end to satisfy the following condition.

$$3.0 < |Lw/fw| < 5.5 \qquad (5)$$

This condition also places restrictions on the power of the first lens group and if the range of Condition (5) is exceeded, the negative power of the first lens group will be too weak and the lens diameter on the screen side will be increased, thereby making it difficult to realize a compact lens system. Below the range of Condition (5), the negative power of the first lens group will be too strong, which makes it difficult to sufficiently correct spherical aberration and coma aberration and therefore difficult to achieve favorable optical performance.

With this zoom lens system that has a two-group arrangement, the second lens group should preferably include a lens with a positive refractive power disposed closest to the display medium side thereof and a cemented lens disposed on an image input side thereof. Cemented lenses have favorable performance for correcting chromatic aberration and the like but are difficult to produce with a high refractive power. Accordingly, by arranging the second lens group with the lens with positive refractive power disposed on the first lens group side, especially closet to the first lens group (closest to a display medium side thereof), and the cemented lens disposed on the opposite side where images are inputted, it is possible to reduce the distance between principal points of the first lens group and the second lens group at the telephoto end. This arrangement is suited to achieving a high zoom ratio.

In one of favorable lens arrangements for this two-group zoom lens system, the first lens group consists of five lenses that respectively have positive, negative, negative, negative, and positive refractive powers from the display medium side thereof. The display medium is a medium on which the image is projected and the medium includes projecting surface medium such as a screen and other display surfaces. The second lens group consists of five lenses that respectively have positive, positive, positive, negative, and positive refractive powers from the display medium side, and the third and fourth lenses from the display medium side of the second lens group construct the cemented lens. On of the embodiments of this zoom lens system with ten lenses has a high zoom ratio of around 1.6 and can display bright images on the display medium.

Another aspect of the present invention is a displaying system that includes the two-group zoom lens system described above and a light modulating device for generating images to be projected by the zoom lens system. In particular, since it is possible to achieve a sufficient back focal length, this zoom lens system is suited to a displaying system where the light modulating device includes a plurality of elements that generate an image by changing the direction of reflection of light. One example of a displaying system is a projector where images are displayed with a screen as the display medium (projecting medium). The display medium is not limited to a screen and may be a wall, a floor, photographic paper, or the like. Since this zoom lens system can realize a high zoom ratio with a simple construction, it is suited to a variety of displaying systems that project images.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

FIG. 1 is a schematic diagram of a projector equipped with a zoom lens system;

FIGS. 2A and 2B show the lens arrangements of the zoom lens system, with FIG. 2A showing the zoom lens system at the wide angle end and FIG. 2B showing the zoom lens system at the telephoto end;

DETAILED DESCRIPTION

Figure 3:
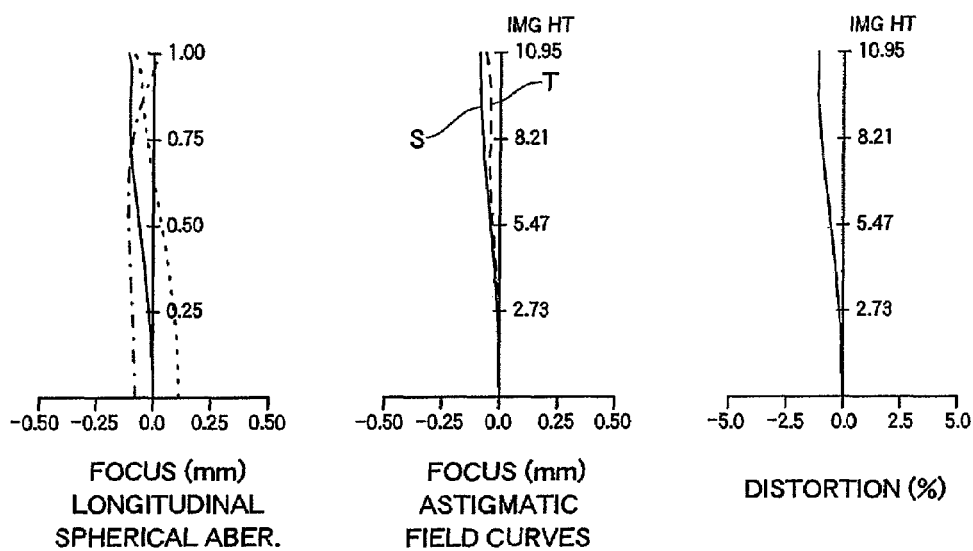
FIG. 3 is a series of longitudinal aberration graphs showing various aberrations of the zoom lens system shown in FIG. 2 at the wide angle end.

FIG. 1 shows the overall conceptual arrangement of a display apparatus that is an embodiment of the present invention. The display apparatus 1 is a projector for displaying images with a screen 9 as a display medium, and includes a zoom lens system 10, a light modulating device 6 for generating images to be projected on the screen 9 by the zoom lens system 10, and an illumination unit 5 for shining illumination light onto the light modulating device 6. The light modulating device (light valve) 6 is a DMD (digital mirror device) that includes a plurality of elements (micromirrors) that generate an image by changing the direction of reflection of light. The illumination unit 5 includes a light source 2 that outputs light of primary colors according to time division and a mirror 3 for reflecting such light toward the DMD 6. The light source 2 is a combination of a white light source and color-splitting filters, but can alternatively be constructed of a combination of light sources such as LEDs that output single colors.

The DMD 6 has the micromirrors that are disposed in two dimensions reflect illumination light corresponding to dots for forming an image in the direction of the zoom lens system 10. The zoom lens system 10 outputs only the light (projecting light) that has been reflected in the effective direction by the DMD 6 in the direction of the screen 9 to form and display an image. The zoom lens system 10 consists, in order from the screen 9 side that is a display medium side and an output side, of a first lens group G1 that has negative refractive power and a second lens group G2 that has positive refractive power.

The zoom lens system 10 is designed to satisfy the following conditions.

| | |
|---|---|
| $0.05 < dt/dw < 0.17$ | (1) |
| $dt < 2.5$ mm | (2) |
| $1.3 < |f1/fw| < 1.6$ | (3) |
| $1.1 < |f2/f1| < 1.4$ | (4) |
| $3.0 < |Lw/fw| < 5.5$ | (5) |

Here, dw is the air distance between the first lens group G1 and the second lens group G2 at the wide angle end, dt is the air distance between the first lens group G1 and the second lens group G2 at the telephoto end, f1 is the combined focal length of the first lens group G1, f2 is the combined focal length of the second lens group G2, fw is the combined focal length of the zoom lens system 10 at the wide angle end, and Lw is the total length of the zoom lens system 10 at the wide angle end.

FIGS. 2A and 2B show enlargements of an example lens arrangement of the lens system 10 that satisfies the conditions given above. FIG. 2A shows the lens arrangement at the wide angle end where images are enlarged and FIG. 2B shows the lens arrangement at the telephoto end which is the standard state. The zoom lens system 10 is composed of ten lenses numbered L11 to L15 and L21 to L25 that are grouped into the two lens groups G1 and G2 from the screen 9 side.

The first lens group G1 on the screen side of the zoom lens system 10 has an overall negative refractive power and in order from the screen side is composed of a positive bi-convex lens L11, a negative meniscus lens L12 that is convex on the screen side, a negative meniscus lens L13 that is convex on the screen side, a negative meniscus lens L14 that is concave on the screen side, and a positive meniscus lens L15 that is convex on the screen side. These five lenses have respectively positive, negative, negative, negative, and positive refractive powers in order from the screen side and the input side surface S6 of the third lens L13 is aspherical.

The second lens group G2 on the image input side of the zoom lens system 10 has an overall positive refractive power and in order from the screen side is composed of a positive bi-convex lens L21, a positive meniscus lens L22 that is convex on the screen side, a positive meniscus lens L23 that is concave on the screen side, a negative meniscus lens L24 that is concave on the screen side, and a positive meniscus lens L25 that is concave on the screen side. These five lenses have respectively positive, positive, positive, negative, and positive refractive powers in order from the screen side, the third lens L23 and the fourth lens L24 in order from the screen side compose a cemented lens, and both surfaces S18 and S19 of the fifth lens L25 are aspherical.

Data on the respective lenses is given below. In the lens data "Rdy" represents the radius of curvature (mm) of each lens disposed in order from the screen side, "Thi" represents the distance (mm) between the respective lens surfaces disposed in order from the screen side, "nd" represents the refractive index (d line) of each lens in order from the screen side, and "vd" represents the Abbe number (d line) of each lens in order from the screen side. The expression "Flat" indicates a flat surface.

LENS DATA

| No. | Rdy | Thi | nd | vd | |
|---|---|---|---|---|---|
| 1 | 84.20000 | 5.20000 | 1.51805 | 64.14 | lens L11 |
| 2 | 664.65000 | 0.20000 | | | |
| 3 | 35.87000 | 2.00000 | 1.74641 | 49.34 | lens L12 |
| 4 | 15.28000 | 5.90000 | | | |
| 5 | 42.27000 | 1.80000 | 1.51805 | 64.14 | lens L13 |
| 6 | 16.46000 | 11.20000 | | | |
| 7 | −21.37000 | 1.40000 | 1.48898 | 70.24 | lens L14 |
| 8 | −35.30000 | 0.50000 | | | |
| 9 | 40.21000 | 2.90000 | 1.85415 | 23.78 | lens L15 |
| 10 | 66.00000 | d10 | | | |
| 11 | 36.09000 | 4.20000 | 1.67305 | 47.23 | lens L21 |
| 12 | −408.92000 | 8.95000 | | | |
| 13 | 30.57000 | 3.60000 | 1.48898 | 70.24 | lens L22 |
| 14 | 104.04000 | 1.80000 | | | |
| 15 | −41.55000 | 4.30000 | 1.48898 | 70.24 | lens L23 |
| 16 | −16.56000 | 1.40000 | 1.81185 | 25.42 | lens L24 |
| 17 | −44.45000 | 2.30000 | | | |
| 18 | −134.41000 | 5.00000 | 1.51805 | 64.14 | lens L25 |
| 19 | −18.69000 | d19 | | | |
| 20 | Flat | 3.00000 | 1.48898 | 70.24 | filter OF |
| 21 | Flat | 0.48000 | | | |

The aspherical coefficients of the surfaces S6, S18 and S19 are as follows.

Surface S6

R=16.460,

K=0.0000

$A=-2.5200\times10^{-5}$, $B=-9.1337\times10^{-8}$ $C=6.7392\times10^{-11}$, $D=-1.8826\times10^{-12}$ The aspherical surfaces are expressed by the following expression using the coefficients K, A, B, C, and D given above with X as the coordinate in the optical axis direction, Y as the coordinate in a direction perpendicular to the optical axis, the direction in which light propagates as positive, and R as the paraxial radius of curvature. This is also the case hereinafter.

$$X=[(1/R)Y^2]/[1+\{1-(1+K)(1/R)^2Y^2\}^{1/2}]+AY^4+BY^6+CY^8+DY^{10}$$

Surface S18

R=−134.410, K=0.0000

$A=-4.2356\times10^{-5}$, $B=-1.5996\times10^{-7}$ $C=1.0255\times10^{-9}$, $D=-1.1181\times10^{-11}$ Surface S19

R=−18.690, K=0.0000

$A=-3.7755\times10^{-6}$, $B=-1.2353\times10^{-7}$ $C=9.1034\times10^{-10}$, $D=-8.5339\times10^{-12}$ Various values for the zoom lens system 10 at wide-angle end and telephoto end are as follows.

| | Wide-angle end | telephoto end |
|---|---|---|
| Air distance d10 between lens group G1 and G2 | 19.74(dw) | 2.25(dt) |
| Air distance d19 (back focus) | 33.53 | 46.74 |
| F Number | 2.20 | 2.76 |
| Combined focal length f | 16.50 | 26.42 |
| Lens length L (length of the lens system only) | 82.39 | 64.90 |

Combined focal length f1 of first lens group: −24.317

Combined focal length f2 of second lens group: 31.613

Zoom ratio: 1.6

Accordingly, the conditions (1) to (5) given above are as follows.

| | |
|---|---|
| Condition (1) (dt/dw) | 0.11 |
| Condition (2) (dt) | 2.25 |
| Condition (3) (|f1/fw|) | 1.47 |
| Condition (4) (|f2/f1|) | 1.3 |
| Condition (5) (|Lw/fw|) | 5.0 |

In this way, the zoom lens system 10 satisfies Conditions (1) to (5) and the ratio (dt/dw) between the air distances when the first lens group G1 and the second lens group G2 approach one another from the wide angle end toward the telephoto end is low at 0.11. When this ratio (dt/dw) is low, usually, the total lens length increases, which makes it difficult to make the lens compact, and there is also a tendency for a fall in peripheral light. However, with the zoom lens system 10, by suppressing the air distance dt at the telephoto end to below 2.5mm, the ratio (dt/dw) is reduced without an excessive lens length at the wide angle end. Accordingly, it is possible to make the overall zoom lens system compact, to obtain sufficient peripheral light, and, by having an F number of 2.20 to 2.76, to display or project bright images.

In addition, the second lens group G2 includes the positive lens L21 which is the closest lens to the screen (i.e., the closest lens to the first lens group G1) and the cemented lens composed of the lenses L23 and L24 which is not disposed closest to the light modulating device 6 but is disposed on the light modulating device side of the second lens group G2. Accordingly, in addition to that the air distance dt between the first lens group G1 and the second lens group G2 at the telephoto end is physically reduced, by disposing a lens with a high power of the second lens group G2 at the closest to the first lens group G1, the zoom lens system 10 is arranged so that the distance between principal points of the first lens group G1 and the second lens group G2 is so reduced. This means that it is possible to realize a zoom lens system with a short overall length, a simple construction composed of ten lenses, and a high zoom ratio of around 1.6.

Figure 4:
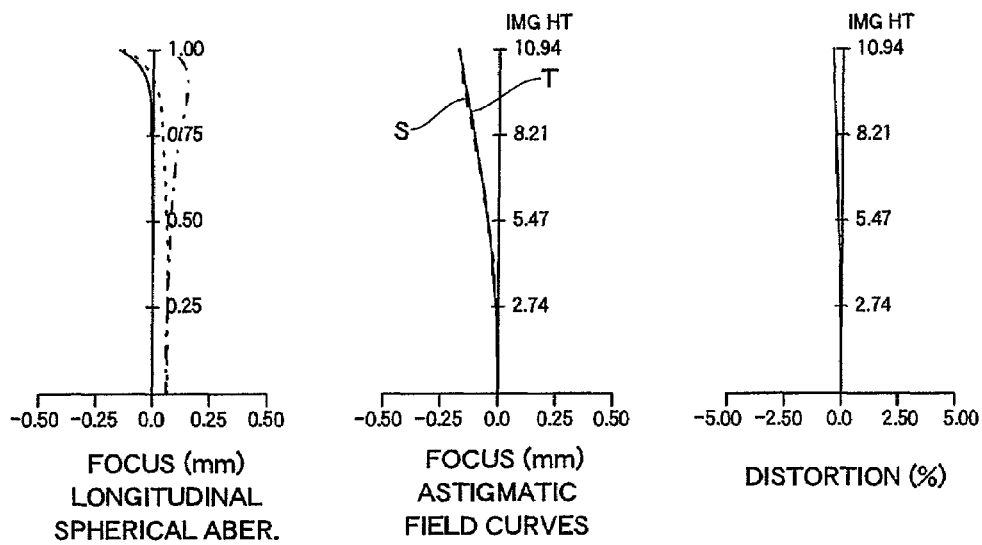
FIG. 4 is a series of longitudinal aberration graphs showing various aberrations of the zoom lens system shown in FIG. 2 at the telephoto end.
Figure 5:
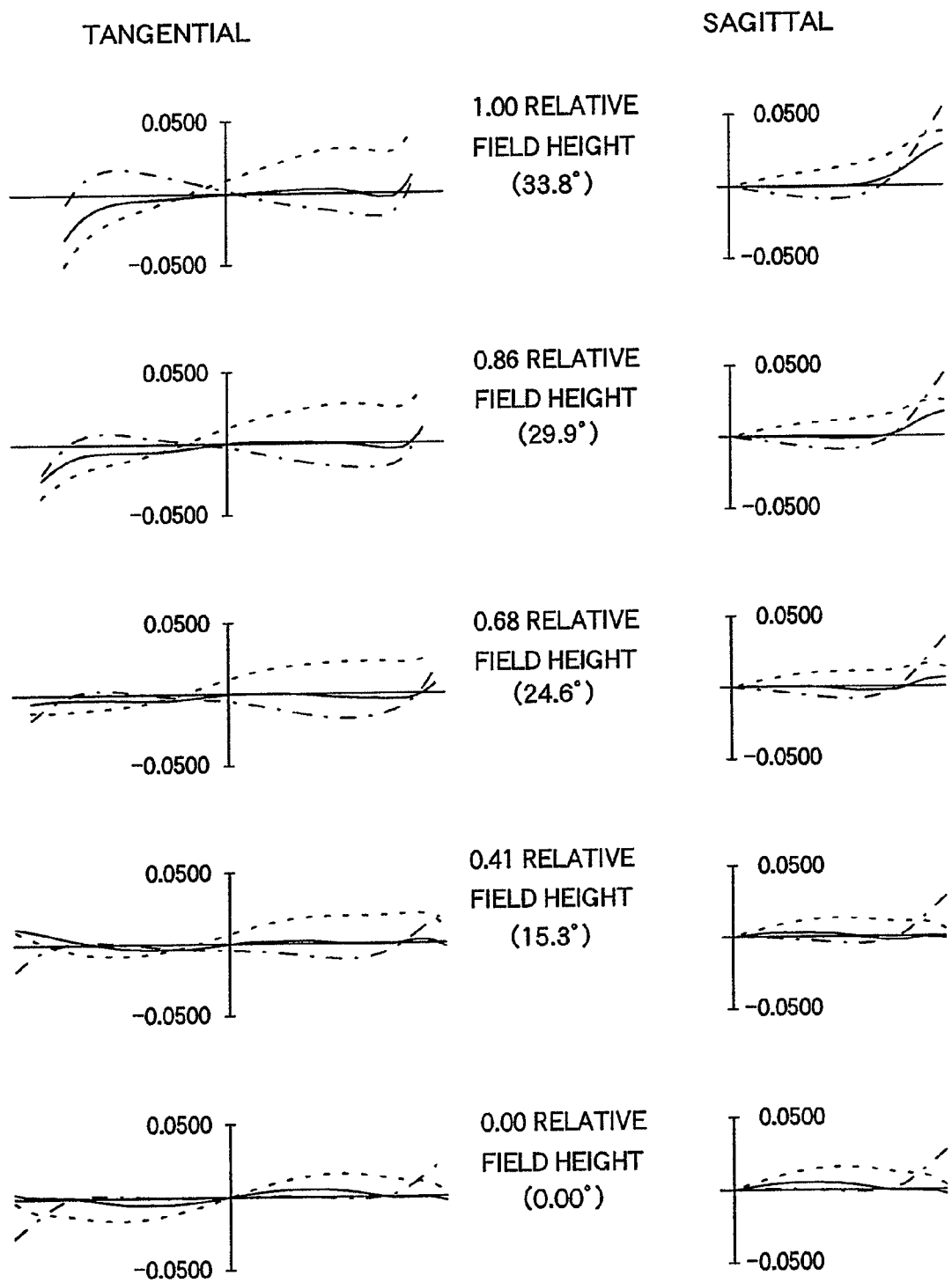
FIG. 5 is a series of lateral aberration graphs showing various aberrations of the zoom lens system shown in FIG. 2 at the wide angle end.
Figure 6:
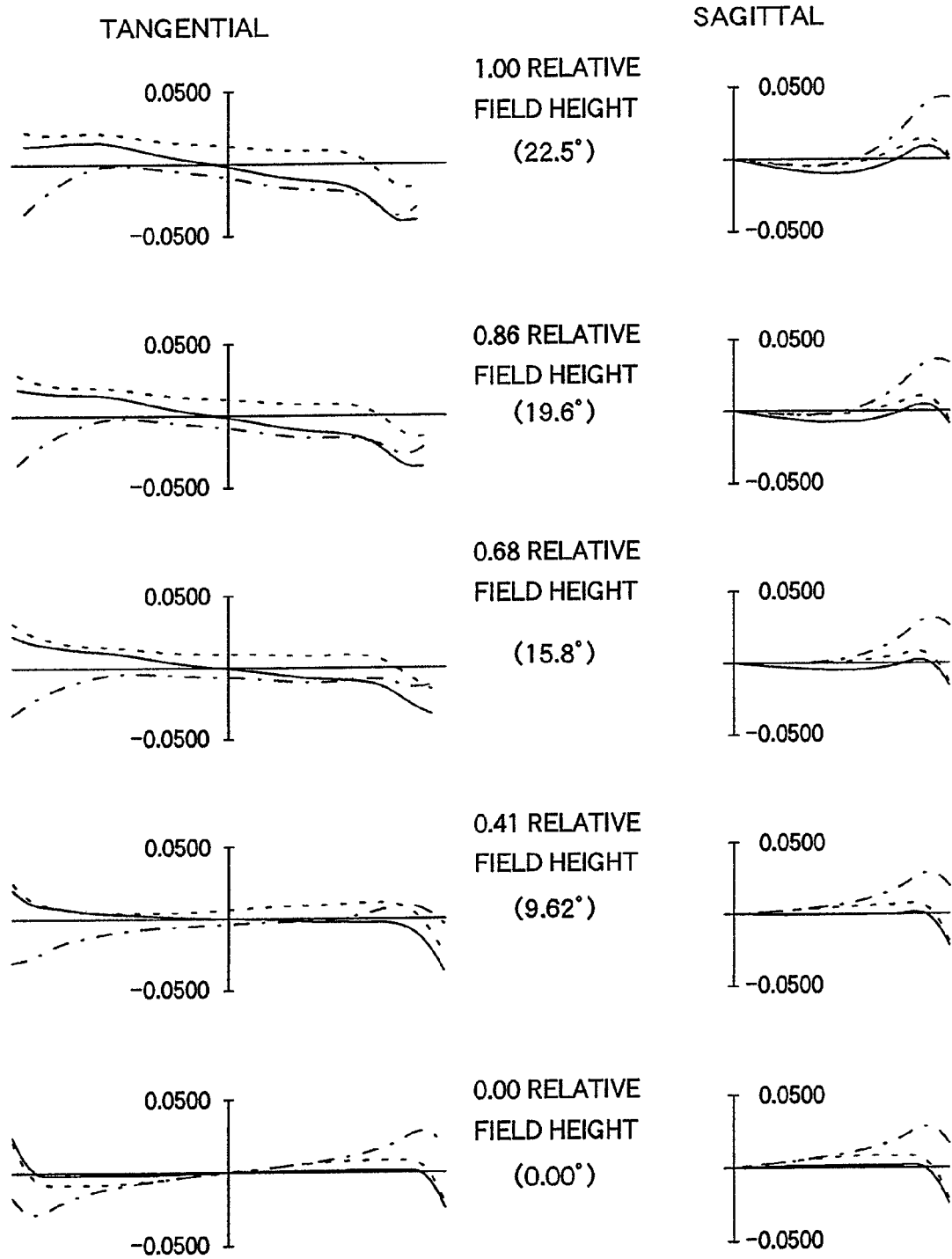
FIG. 6 is a series of lateral aberration graphs showing various aberrations of the zoom lens system shown in FIG. 2 at the telephoto end.

Since the zoom lens system satisfies Conditions (1) to (5) given above and has one aspherical surface in the first lens group G1 and two aspherical surfaces in the second lens group G2, various types of aberration are favorably corrected. As a result, sharp images can be projected onto the screen 9. FIG. 3 and FIG. 4 show the spherical aberration, astigmatism, and distortion of the zoom lens system 10 at the wide-angle end and at the telephoto end by way of longitudinal aberration graphs. FIG. 5 and FIG. 6 show the spherical aberration at the wide-angle end and at the telephoto end by way of lateral aberration graphs. Values of the spherical aberration for the respective wavelengths of 650 nm (broken line), 550 nm (solid line), and 450 nm (dot-dash line) are shown. In addition, in the graphs showing the astigmatism and the lateral aberration, aberration for tangential rays (T) and sagittal rays (S) are shown. As shown in these drawings, the various types of aberration, including spherical aberration and coma aberration are favorably corrected, which means that the zoom lens system 10 has favorable optical performance.

The projector 1 equipped with the two-group zoom lens system 10 is compact and has a high zoom ratio. Accordingly, the projector 1 is suited to being used with a mobile information terminal to project images or data onto a screen 9 as a display medium. In addition, a display apparatus equipped with the zoom lens system 10 is not limited to being used to project onto the screen 9 and can be applied to a variety of uses for projecting on a variety types of display media, such as projecting images onto a display surface of TV, a wall surface or projecting images used to expose photographic paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A zoom lens system consisting, in order from a display medium side, of a first lens group that has negative refractive power and a second lens group that has positive refractive power, the first lens group and the second lens group respectively including at least one aspherical surface, wherein an air distance dw between the first lens group and the second lens group at the wide angle end, an air distance dt between the first lens group and the second lens group at the telephoto end, a combined focal length f1 of the first lens group, a combined focal length f2 of the second lens group, and the combined focal length fw of the zoom lens system at the wide angle end satisfy the following conditions $0.05 < dt/dw < 0.17$ $dt < 2.5$ $1.3 < |f1/fw| < 1.6$ $1.1 < |f2/f1| < 1.4$.

2. The zoom lens system according to claim 1, wherein the total length Lw of the zoom lens system at the wide angle end satisfies the following condition $3.0 < |Lw/fw| < 5.5$.

3. The zoom lens system according to claim 1, wherein the second lens group includes a lens with a positive refractive power disposed closest to a display medium side thereof and a cemented lens disposed on an image input side thereof.

4. The zoom lens system according to claim 3,
wherein the first lens group consists of five lenses that respectively have positive, negative, negative, negative, and positive refractive powers from the display medium side, and
the second lens group consists of five lenses that respectively have positive, positive, positive, negative, and positive refractive powers from the display medium side, with the third and fourth lenses from the display medium side constructing the cemented lens.

5. A displaying system comprising:
the zoom lens system according to claim 1; and
a light modulating device for generating images to be projected by the zoom lens system.

6. The displaying system according to claim 5,
wherein the light modulating device includes a plurality of elements that generate an image by changing a direction of reflection of light.

* * * * *